A. J. BROWN.
DYNAMO ELECTRIC MACHINE.
APPLICATION FILED AUG. 5, 1911.
1,151,860.
Patented Aug. 31, 1915.
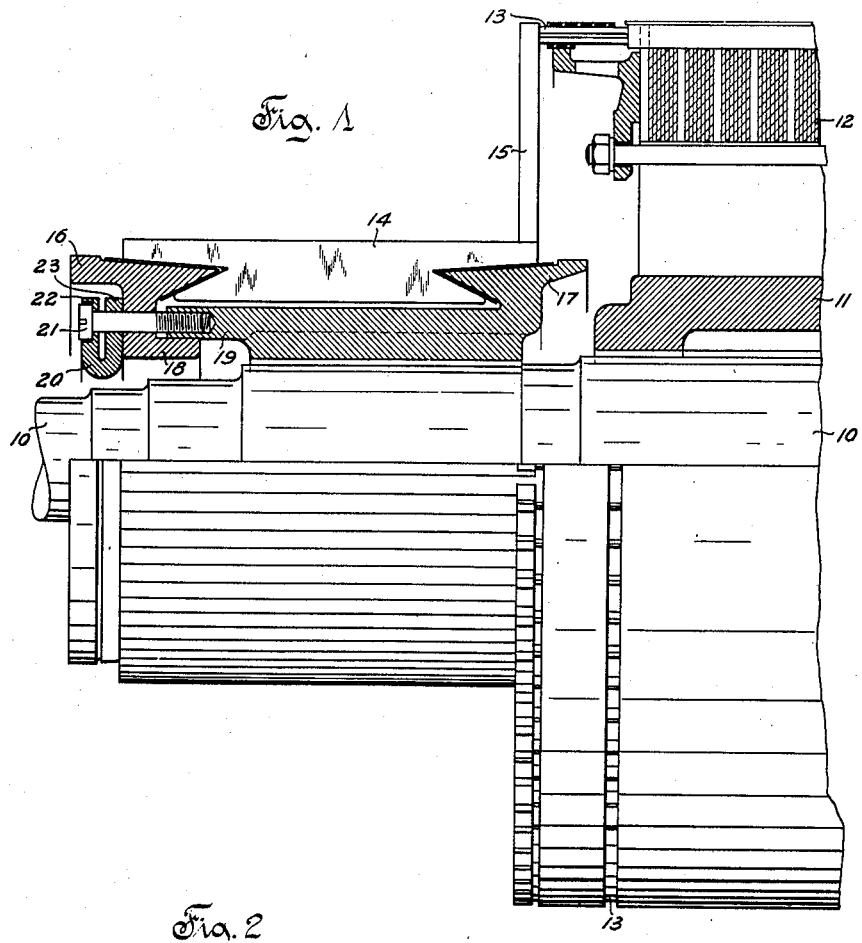

UNITED STATES PATENT OFFICE.

ARTHUR J. BROWN, OF MILWAUKEE, WISCONSIN, ASSIGNOR, BY MESNE ASSIGNMENTS, TO ALLIS-CHALMERS MANUFACTURING COMPANY, A CORPORATION OF DELAWARE.

DYNAMO-ELECTRIC MACHINE.

1,151,860.  Specification of Letters Patent.  Patented Aug. 31, 1915.

Application filed August 5, 1911. Serial No. 642,578.

*To all whom it may concern:*

Be it known that I, ARTHUR J. BROWN, a citizen of the United States, residing at Milwaukee, in the county of Milwaukee and State of Wisconsin, have invented certain new and useful Improvements in Dynamo-Electric Machines, of which the following is a full, clear, and exact specification.

This invention relates to dynamo-electric machines and particularly to commutators of such machines.

In the operation of dynamo-electric machines, current passing through the commutator heats the commutator bars causing more or less expansion. The degree of expansion depends upon the strength of the current and the dimensions of the commutator bars. In some machines, commutators are subjected to comparatively heavy currents which results in considerable expansion of said bars. It is necessary to provide for the expansion and contraction of these commutator bars in order to maintain the commutating surface of such commutators in a smooth condition to render the operating conditions safe and economical.

It is, therefore, the object of this invention to provide for the expansion and contraction of commutator bars to maintain the commutating surface of such commutators in a smooth conditions to render operation successful.

This object is accomplished by providing a support comprising relatively movable parts in which the commutator bars are retained, and supporting these movable parts yieldably with respect to each other by the use of a resilient annulus, U-shaped in section, or a member bent back on itself, which is responsive to the expansion and contraction of the commutator bars.

The invention is illustrated on the accompanying sheet of drawings in which—

Figure 1 shows a portion of the rotating member of a dynamo-electric machine having a commutator equipped with my invention; and Fig. 2 is a fragmentary end view of said commutator.

The various novel features of my invention will be apparent from the description and drawings and will be particularly set forth in the appended claims.

Mounted upon and secured to the shaft 10 of the rotating member of a dynamo-electric machine is a sleeve 11, upon which is mounted a laminated core 12. This laminated core is provided with coils 13 connected to commutator bars 14 by connectors 15. The commutator bars are supported in a spider including two relatively movable parts 16 and 17, the latter of which is keyed to the shaft 10. These parts 16 and 17 have sleeved portions 18 and 19 respectively, adapted to slide over each other for centering the commutator bars and to provide for longitudinal movement of said parts when the commutator bars are caused to expand and contract due to the heat developed in said commutator bars and dissipated therefrom.

In order to maintain the commutating surface of the commutator smooth at all times and to render economical operation successful, resilient means has been provided in connection with the movable part of the spider and which is responsive to the expansion and contraction of the commutator bars. This resilient means comprises an annulus 20 U-shaped in section or a member bent back on itself. This resilient member, in the preferable form, is disposed within the outer periphery of the part 16 of the spider, and is held in place by screws or bolts 21 engaging said resilient member and passing through the movable part 16 and into the other part 17 of the spider.

If the commutator bars are caused to expand, the movable part 16 of the spider will be forced longitudinally outward against the action of the resilient member 20, causing the legs 22 and 23 of the U-shaped resilient annulus to move closer toward each other. Upon the contraction of the commutator bars, the legs 22 and 23 of the resilient member 20 will gradually move apart, causing the movable part 16 of the spider to move longitudinally inward to rigidly support the bars in the spider. The commutator bars are, therefore, held rigidly under all conditions of operation, and any expansion or contraction of the commutator bars is taken up by the resilient member 20, thus maintaining the commutating surface of the commutator in a smooth operating condition under all circumstances.

There may be many modifications of the precise form and arrangement herein shown and described, and I aim to cover all such modifications which do not involve a departure from the spirit and scope of my invention as set forth in the claims.

What I claim as new is:

1. In a dynamo-electric machine, a shaft, a two-part commutator support mounted thereon, commutator bars on said support, a resilient member bent back on itself and responsive to expansion and contraction of said bars to maintain the commutating surface of said commutator in a true condition, and means independent of said shaft and engaging both parts of said bar supporting means for maintaining said resilient member in position relative to said supporting means.

2. In a commutator for a dynamo-electric machine, a support comprising two relatively movable parts, commutator bars mounted in said support, a resilient annulus U-shaped in section responsive to the expansion and contraction of said bars to maintain the commutating surface of said commutator in a smooth condition, said annulus abutting one of said relatively movable parts, and threaded members engaging said annulus and passing through said last mentioned part and into the other part to maintain said annulus in a fixed position.

3. In a dynamo-electric machine, a commutator support comprising two relatively movable parts, commutator bars mounted on said support, and means for resiliently maintaining said relatively movable parts in operative position and for maintaining the surface of said commutator in smooth condition while permitting expansion and contraction of the bars, said maintaining means comprising resilient means and a plurality of threaded members for holding said relatively movable parts together and said resilient means in operative position relatively to said parts.

Milwaukee, Wis., July 25, 1911.

In testimony whereof I affix my signature, in the presence of two witnesses.

ARTHUR J. BROWN.

Witnesses:
  THOS. QUINLAN,
  A. F. GRULER.